(12) United States Patent
Omelchuk et al.

(10) Patent No.: US 9,740,311 B1
(45) Date of Patent: *Aug. 22, 2017

(54) FULL-BRIDGE TIP DRIVER FOR ACTIVE STYLUS

(71) Applicant: Wacom Co., Ltd., Saitama (JP)

(72) Inventors: Ruslan Omelchuk, Lviv (UA); Mykhaylo Krekhovetskyy, Lviv (UA)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,922

(22) Filed: Aug. 11, 2015

Related U.S. Application Data

(63) Continuation of application No. 13/336,862, filed on Dec. 23, 2011, now Pat. No. 9,104,251.

(60) Provisional application No. 61/512,359, filed on Jul. 27, 2011.

(51) Int. Cl.
| | |
|---|---|
| *G06F 3/0354* | (2013.01) |
| *G06F 3/041* | (2006.01) |
| *G06F 1/16* | (2006.01) |
| *G06F 3/0338* | (2013.01) |
| *G06F 3/044* | (2006.01) |

(52) U.S. Cl.
CPC ......... *G06F 3/03545* (2013.01); *G06F 1/169* (2013.01); *G06F 3/0338* (2013.01); *G06F 3/044* (2013.01); *G06F 3/0412* (2013.01); *G06F 3/0416* (2013.01); *G06F 2203/04104* (2013.01); *G06F 2203/04106* (2013.01); *G06F 2203/04808* (2013.01)

(58) Field of Classification Search
CPC .... G06F 3/03545; G06F 3/0416; G06F 3/017; G06F 1/1626; G06F 1/1684; G06F 1/169; G06F 2203/04806; G06F 2203/04808; G06F 3/011; G06F 3/016; G06F 3/0304; G06F 3/04812; G06F 3/04815; G06F 3/04886; G06F 3/1446; G06T 19/006; G06T 2219/20
See application file for complete search history.

(56) References Cited

U.S. PATENT DOCUMENTS

| | | |
|---|---|---|
| 3,783,196 A | 1/1974 | Stanley |
| 3,808,364 A | 4/1974 | Veith |
| 4,497,052 A | 1/1985 | Wada et al. |

(Continued)

FOREIGN PATENT DOCUMENTS

| | | |
|---|---|---|
| JP | 63144381 | 6/1988 |
| JP | 6314155 B2 | 8/1994 |
| JP | 2010067117 A | 3/2010 |

OTHER PUBLICATIONS

Montrose, Mark, EMC and the Printed Circuit Board, IEEE Press, pp. 34-37.*

(Continued)

*Primary Examiner* — Patrick Edouard
*Assistant Examiner* — Maheen Javed
(74) *Attorney, Agent, or Firm* — Seed Intellectual Property Law Group LLP (57) ABSTRACT

A stylus may include an electrode that is positioned on the body of the stylus. The stylus may further include a switch. Furthermore, the switch may be used to provide a capacitance that is coupled to the electrode positioned on the body of the stylus to decrease a resistance to an electrical current through the stylus.

12 Claims, 7 Drawing Sheets

(56) References Cited

U.S. PATENT DOCUMENTS

| | | | |
|---|---|---|---|
| 5,889,237 | A | 3/1999 | Makinwa |
| 7,342,350 | B2 | 3/2008 | Toda |
| 7,719,515 | B2 | 5/2010 | Fujiwara et al. |
| 2005/0162411 | A1 | 7/2005 | Berkel van |
| 2008/0129711 | A1* | 6/2008 | Bergstrom .......... G06F 3/03545 345/179 |
| 2009/0033632 | A1 | 2/2009 | Szolyga et al. |
| 2009/0211821 | A1 | 8/2009 | Yeh et al. |
| 2011/0018843 | A1* | 1/2011 | Ogawa ................... G02F 1/167 345/179 |
| 2011/0096016 | A1 | 4/2011 | Yilmaz |
| 2011/0169756 | A1* | 7/2011 | Ogawa ................ G06F 3/03545 345/173 |
| 2012/0154340 | A1* | 6/2012 | Vuppu ................... G06F 3/044 345/179 |
| 2013/0002606 | A1 | 1/2013 | Mann |
| 2013/0038579 | A1 | 2/2013 | Boyd et al. |
| 2013/0207938 | A1* | 8/2013 | Ryshtun ............... G06F 3/0416 345/179 |

OTHER PUBLICATIONS

David S. Hecht, "Carbon-nanotube film on plastic as transparent electrode for resistive", Society for information Display, vol. 17, Issue 11, pp. 941-946, Nov. 2009.
Montrose, Mark I., EMC and the Printed Circuit Board: Design, Theory, and Layout Made Simple, 1999, IEEE Press, pp. 34-37.
Meade, Russell L. & Diffenderfer, Robert, Foundation of Electronics: Circuits and Devices, Jul. 2002, Cengage Learning, Edition 4, pp. 72-75.

\* cited by examiner

FULL-BRIDGE TIP DRIVER FOR ACTIVE STYLUS

RELATED APPLICATIONS

This application is a continuation of U.S. patent application Ser. No. 13/336,862, filed Dec. 23, 2011, now U.S. Pat. No. 9,104,251, issued on Aug. 11, 2015, which claims priority to U.S. Provisional Patent Application No. 61/512,359, filed Jul. 27, 2011, all of which are incorporated by reference herein in their entirety.

TECHNICAL FIELD

This disclosure relates to the field of user interface devices and, in particular, to capacitive sensor devices.

BACKGROUND

The use of stylus with touch screens is well established, but some existing technologies have disadvantages of one or more of cost, performance and reliability. Touch screen designs have incorporated many different technologies including resistive, capacitive, inductive, and radio frequency sensing arrays.

A capacitive stylus uses a power source (e.g., a battery) to generate a transmit (TX) signal at the tip of the stylus. Increasing the TX signal (e.g., an electrical current) will allow the touch screen sensing system to better track the position of a stylus that is contacting or hovering over a touch screen (e.g., a capacitive sense array). However, increasing the TX signal will cause an increase in the power consumption of the capacitive stylus. The power source of the capacitive stylus may be not be capable of supplying the extra power (e.g., voltage) to increase the TX signal or the power source of the capacitive stylus may not be capable of supplying the extra power for an extended period of time. For example, the power source may be a battery which is not capable of generating the extra power to increase the TX signal. In another example, if the battery is capable of generating the extra power to increase the TX signal, this may result in draining the battery faster which shortens the time a user can use the capacitive stylus.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to increase the TX signal generated by a capacitive stylus without increasing the power used by the capacitive stylus. In one embodiment, a full bridge driver is described. The full bridge driver may provide an electrical contact (e.g., an electrode) positioned on the body of the stylus to contact a human body (e.g., the body of the user). The electrical contact may form the stylus current return path. The full bridge driver may include a first bridge branch which is coupled to a capacitive tip of the stylus, and a second bridge branch which his coupled to the electrical contact. The full bridge driver may also enlarge the amplitude of the TX signal without increasing the power consumption of the capacitive stylus. In addition, the full bridge driver may reduce the power consumption of the stylus while maintaining a certain TX signal strength.

A capacitive stylus may be a synchronized capacitive stylus or an unsynchronized capacitive stylus. A synchronized capacitive stylus is stylus where the stylus TX signal is generated in frequency and phase relation to a synchronization signal generated by a host device (e.g., a touch screen). An unsynchronized capacitive stylus operates without any synchronization with a host controller. An unsynchronized stylus may transmit a TX signal according to one or more of internal procedures and algorithms.

Figure 1:
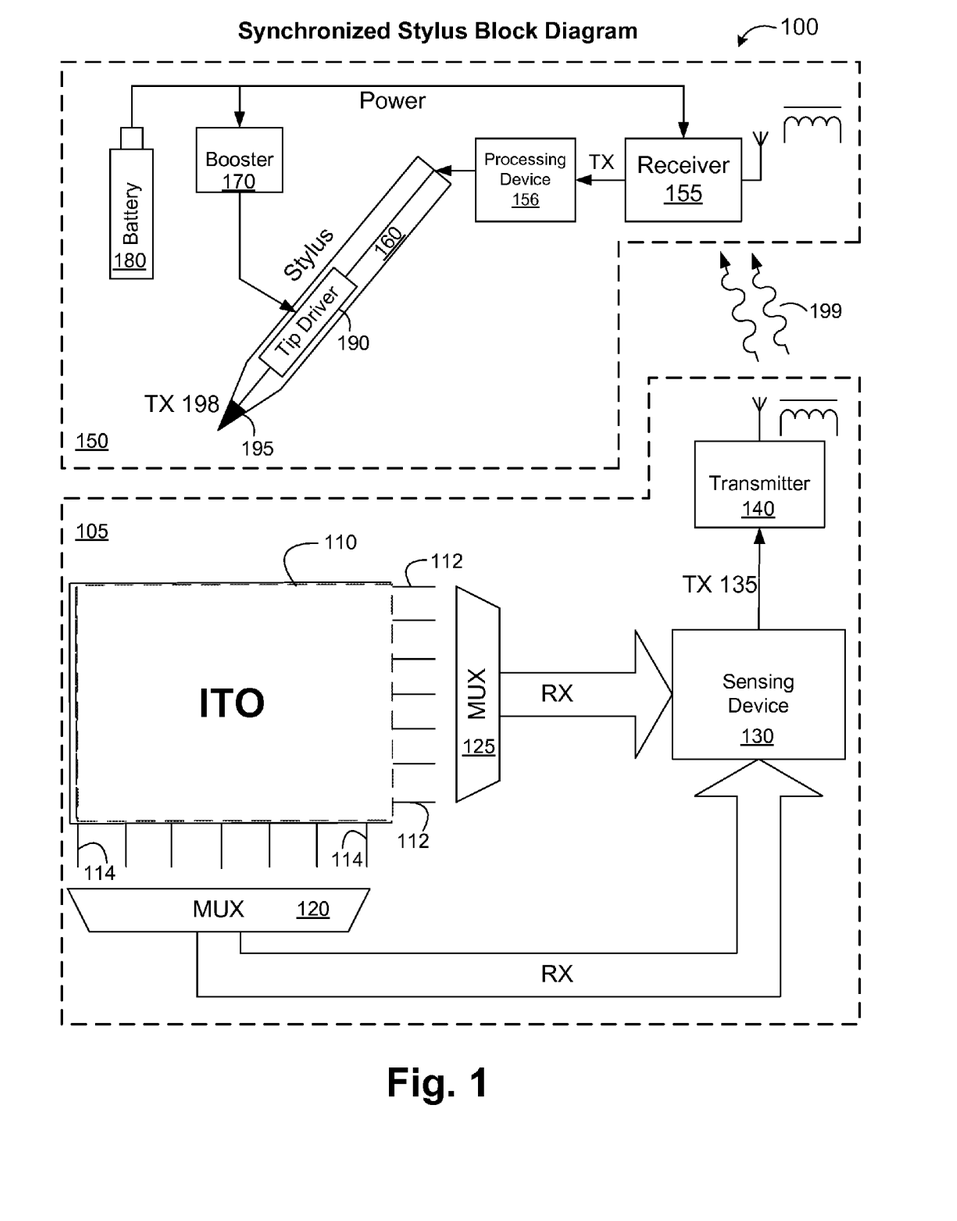
FIG. 1 is a block diagram illustrating one embodiment of an electronic system for synchronizing a stylus to a host device.

FIG. 1 is a block diagram illustrating one embodiment of an electronic system 100 for synchronizing a stylus 150 to a host device 105. The stylus 150 may be a capacitive stylus. The stylus 150 may also be an untethered stylus. The host device 105 includes a capacitive sense array 110, multiplexor ("MUX") devices 120 and 125, sensing device 130, and transmitter 140. In an embodiment, the capacitance sense array 110 is an all-points addressable mutual capacitance sense array (e.g., sense array 400). In yet another embodiment, the capacitive sense array 110 is an Indium-Tin-Oxide ("ITO") panel. The capacitive sense array 110 ("sense array 110" or "ITO 110") is composed of rows 112 and columns 114 of electrodes. The rows 112 and columns 114 are coupled to the MUX's 125 and 120, respectively. MUX's 120, 125 are coupled to the sensing device 130. The sensing device 130 is coupled to the transmitter 140.

In one embodiment, the rows 112 and columns 114 of electrodes of the capacitive sense array 110 are configured to operate as TX and RX electrodes of a mutual capacitance sense array in a first mode to detect touch objects (e.g., rows 112 may be TX electrodes and columns 114 may be TX electrodes, or vice versa), and to operate as electrodes of a coupled-charge receiver in a second mode to detect a stylus on the same electrodes of the sense array. The stylus 150, which generates a stylus TX signal 198 (e.g., an electrical current) when activated, is used to couple charge to the capacitive sense array, instead of measuring a mutual capacitance at an intersection of a RX electrode and a TX electrode (a sense element) as done during mutual capacitance sensing. The sensing device 130 does not use mutual capacitance or self-capacitance sensing to measure capacitances of the sense elements when performing a stylus can. Rather, the sensing device 130 measures a charge that is capacitively coupled between the capacitive sense array 110 and the stylus 150 as described herein.

In one embodiment, the sensing device 130 may be integrated into a processing device. Sensing device 130 may include analog I/O for coupling to an external component, including, but not limited to a touch-sensor pad, a touch screen, a touch-sensor slider (not shown), a touch-sensor buttons (not shown), and other devices. Sensing device 130 may be integrated into the integrated circuit (IC) of the processing device, or alternatively, in a separate IC. Alternatively, descriptions of sensing device 130 may be generated and compiled for incorporation into other integrated circuits. For example, behavioral level code describing sensing device 130, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe sensing device 130. In another embodiment, the sensing device 130 may be a host controller.

In the depicted embodiment, the stylus block 150 comprises a receiver 155, a processing device 156, a battery 180, a booster 170, a tip driver 190, and a stylus tip 195. The processing device 156 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like. In one embodiment, the processing device 156 may be a Programmable System on a Chip (PSoC®) processing device, developed by Cypress Semiconductor Corporation, San Jose, Calif.

The stylus block 150 represents the components that are housed within the stylus body 160 as depicted in FIG. 1. The battery 180 is coupled to the booster 170 and receiver 155. The booster 170 is coupled to the tip driver 190. The processing device 156 is coupled to the receiver 155 and the tip driver 190.

In an embodiment, the sensing device 130 generates and couples a TX signal 135 to the transmitter 140. The transmitter 140 wirelessly couples the TX signal 135 to the receiver 155. In one embodiment, the transmitter 140 inductively couples the TX signal 135 to the receiver 155. In other embodiments, the transmitter may wirelessly couple the TX signal 135 in a variety of ways including radio frequency, optical, ultrasound, and other mediums that would be appreciated by one of ordinary in the art. The receiver 155 receives TX signal 199 from the transmitter 140 and couples demodulated TX signal to the stylus 150.

In one embodiment, the TX 135 signal sent by the transmitter 140 is the same signal as the TX signal generated and applied to the ITO 110 on the TX lines 112 (or 114) during finger position tracking. Alternatively, the TX signal 135 may be a different signal than the TX signal generated and applied to the ITO 110 and may have different signal characteristics (e.g., different frequency, phase, or code modulation). In another embodiment, the transmitter 140 sends a synchronization signal 199, or timing data, whereby the stylus 150 generates the stylus TX signal 198 based on the synchronization signal 199 received by the receiver 155 from the transmitter 140. In an embodiment, the synchronization signal 199 has different signal characteristics than the TX signal generated and applied to the ITO 110 during finger position tracking.

In one embodiment, the stylus 150 is a synchronized stylus. As discussed above, a stylus 150 may use the receiver 155 to receive a synchronization signal 199 transmitted by the transmitter 140. In another embodiment, the stylus 150 may be an unsynchronized stylus. An unsynchronized stylus may operate without using the synchronization signal 199. Thus, in an unsynchronized stylus, the receiver 155 may not be used, and may not be included in the stylus 150.

In an embodiment, the battery 180 voltage may be provided by battery cells (e.g., 1.5V AAA cells). The booster 170 boosts the battery voltage delivered to the tip driver 190, allowing the tip driver 190 to amplify the TX signal 135 to a higher voltage (e.g., 10V-20V). A high voltage stylus TX signal 198 may enable the host device 105 to detect the stylus 150 when it is "hovering," or in close proximity to the capacitive sense array 110, but not physically touching an overlay disposed over the capacitive sense array 110. A high voltage stylus TX signal 198 may also provide for faster and more robust detection by the sensing device 130.

The stylus 150 capacitively couples the amplified stylus TX signal 198 from the stylus tip 195 (e.g., a tip electrical current) to the capacitive sense array 110. The rows 112 and columns 114 of electrodes (configured as RX electrodes in stylus position tracking mode) sense the stylus TX signals 198 and send the received stylus TX signals 198 to the sensing device 130 via MUX's 120 and 125. In an embodiment, the stylus TX signals 198 are referred to as RX signals once they are sensed by one or more of the rows 112 and columns of electrodes on the ITO 110. As shown, the sensing device 130 receives the stylus TX signal 198 by RX'ing on both the rows 112 and columns 114 of electrodes of capacitive sense array 110. In an embodiment, the sensing device 130 performs a stylus scan of the rows 112 and columns 114 of capacitance sense array 110 when sensing the stylus TX signal 198. The sensing device 130 determines the location of the stylus 150 based on the relative strength of the TX signal 198 on each of the rows 112 and columns 114 elements of the capacitance sense array 110.

The synchronized operation of the host 105 and stylus 150 enables the sensing device 130 to substantially simultaneously track a passive touch object (e.g., finger) and stylus 150 on the sense array 110. Synchronization ensures that the stylus 150 transmits a stylus TX signal 198 during a period when the sensing device 130 is not TX'ing for passive touch object sensing.

Figure 2:
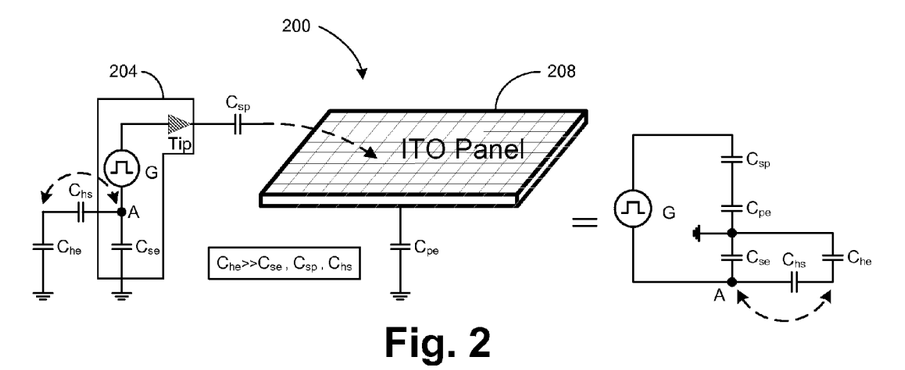
FIG. 2 is a block diagram illustrating an electrical equivalent circuit diagram of a stylus on an ITO panel, according to one embodiment.

FIG. 2 is a block diagram 200 illustrating the electrical equivalent circuit diagram of a stylus 204 on an ITO panel 208, according to an embodiment. The block diagram 200 includes the ITO panel 208 and the stylus 204. $C_{sp}$ is the capacitance between the tip of the stylus 204 and the ITO panel 208. $C_{se}$ is the self-capacitance of the stylus 204, relative to ground (e.g., earth ground). $C_{pe}$ is the self-capacitance of the ITO panel 208 relative to ground. $C_{hs}$ is the capacitance between the user and the stylus. $C_{he}$ is the self-capacitance of a body of the user (e.g., a human body), relative to ground. Capacitance $C_{he}$ is larger than $C_{hs}$. However, capacitances $C_{he}$ and $C_{hs}$ are connected sequentially and the resulting capacitance will be limited to the smaller capacitance $C_{hs}$. As discussed above, the stylus 204 may transmit a TX signal from the tip of the stylus 204. The TX signal from the stylus 204 is divided among the capacitors $C_{sp}$, $C_{pe}$, and $C_{se}+C_{hs}$. Although capacitance $C_{he}$ is larger than capacitances $C_{se}$ and $C_{sp}$, the self-capacitance of the user's body (e.g., $C_{he}$) does not affect the operation of the stylus 204 and the ITO panel 208 because the user's body (e.g., the human body) is connected through the smaller capacitance $C_{hs}$. The TX signal transmitted from the stylus is flows through the capacitance $C_{pe}$. In one embodiment, the TX signal can be increased by reducing the impact of capacitances $C_{se}$ or $C_{sp}$. In another embodiment, providing an electrode (which introduces the capacitance of the user's body CO between the capacitances $C_{se}$ and $C_{hs}$ (e.g., point A in FIG. 2), reduces the impact of the capacitance $C_{hs}$ on the circuit. By introducing the larger capacitance $C_{he}$ to the circuit, the resistance of the circuit is decreased and more electrical current can flow through the circuit, thus increasing the TX signal transmitted by the stylus.

Figure 3:
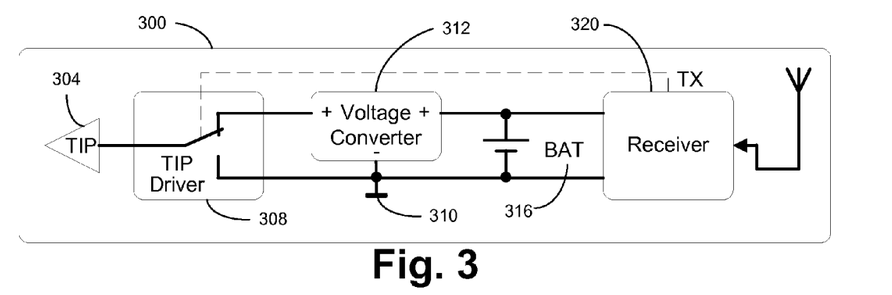
FIG. 3 is a block diagram of a stylus, according to one embodiment.

FIG. 3 is a block diagram of a stylus 300, according to one embodiment. The stylus 300 may an untethered, synchronized, capacitive stylus. The stylus 300 includes a tip 304, a tip driver 308 which includes a switch, a voltage converter 312, a battery 316, and a receiver 320. The receiver 320 may receive a synchronization signal from a transmitter, such as the transmitter 140 of FIG. 1. The battery 316 may be used to provide power for the receiver 320. The battery 316 may also provide a voltage (e.g., an electrical current) to voltage converter 312. The voltage converter may boost the voltage provided by the battery 316 to increase the TX signal transmitted by the tip 304. In one embodiment, the tip driver 308 includes a switch, which switches (e.g., oscillates) between the internal ground of the stylus 310, and the voltage received from the voltage converter 312. When the switch connects to (e.g., switches to) the voltage converter 312, the electrical current (e.g., the TX signal) received from the voltage converter 312 is passed to the tip 304. When the switch connects to the internal ground of the stylus, no electrical current is passed to the tip 304. The tip driver 308 may be referred to as a push-pull driver.

Figure 4:
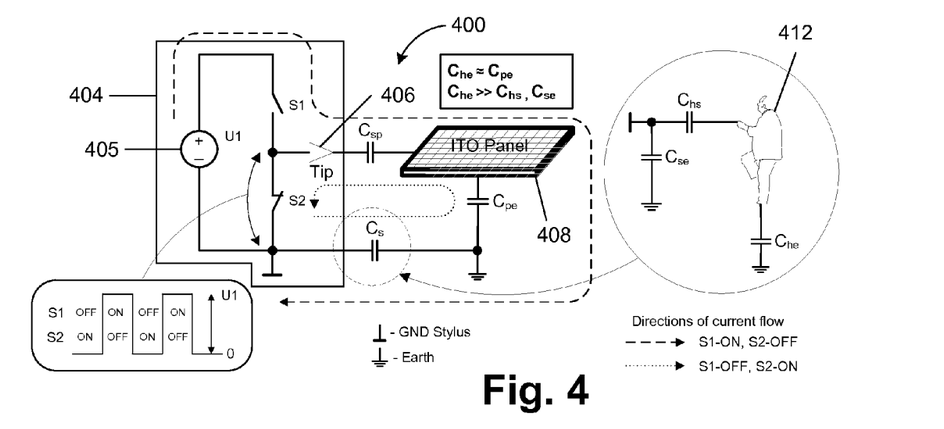
FIG. 4 is a block diagram illustrating an electrical equivalent circuit diagram of a stylus on an ITO panel, according to another embodiment.

FIG. 4 is a block diagram 400 illustrating the electrical equivalent circuit diagram of a stylus 404 on an ITO panel 408, according to another embodiment. The block diagram 400 includes the ITO panel 408 and the stylus 404.

The stylus 404 includes two switches S1 and S2, a power source 405, and a tip 406. In one embodiment, the switches S1 and S2 may be mutually exclusive switches. For example, if switch S1 is connected (e.g., on), then switch S2 is not connected (e.g., off), and vice versa. Switches S1 and S2 may correspond to the switch in the tip driver 308 of FIG. 3. When switch S1 is on and switch S2 is off, an electrical current (with an amplitude of U1) provided by the power source 405 is passed through to the tip 406 (e.g., $C_{sp}$, $C_{pe}$ and $C_s$ are charged by the power source). The flow of the electrical current when switch S1 is on and switch S2 is off is shown by the dashed line going clockwise in FIG. 4. When switch S1 is off and switch S2 is on, $C_{sp}$, $C_{pe}$ and $C_s$ are discharged and current flows through the switch S2 and the tip 406 in the opposite direction. The flow of the electrical current when switch S1 is off and switch S2 is on is shown by the dotted line going counter-clockwise in FIG. 4. As shown in FIG. 4, the voltage of the electrical current is unipolar, e.g., it varies between the value 0 and U1.

$C_{sp}$ is the capacitance between the tip 406 of the stylus 404 and the ITO panel 408. $C_{pe}$ is the self-capacitance of the ITO panel 408 relative to ground. $C_s$ is a combination of $C_{hs}$, $C_{se}$, and $C_{he}$. $C_{he}$ is the self-capacitance of a body of the user 412 (e.g., a human body), relative to ground. $C_{se}$ is the self-capacitance of the stylus 404, relative to ground (e.g., earth ground). $C_{hs}$ is the capacitance between the user 412 and the stylus 404. $C_s$ may be calculated using the following equation:

$$C_S = \frac{C_{hs} * C_{he}}{C_{hs} + C_{he}} + C_{se} \approx C_{hs} + C_{se} \qquad (1)$$

As shown in FIG. 4, $C_{he}$ is commensurate with $C_{pe}$. In addition, $C_{he}$ is also larger than $C_{hs}$ and $C_{se}$. As discussed above, the capacitance of the user's body (e.g., $C_{he}$) has little or no effect on the operation of the ITO panel 408 and the stylus 404. Capacitances $C_{he}$ and $C_{hs}$ are connected sequentially so the resulting capacitance will be commensurate with (e.g., limited by) $C_{hs}$.

Figure 5:
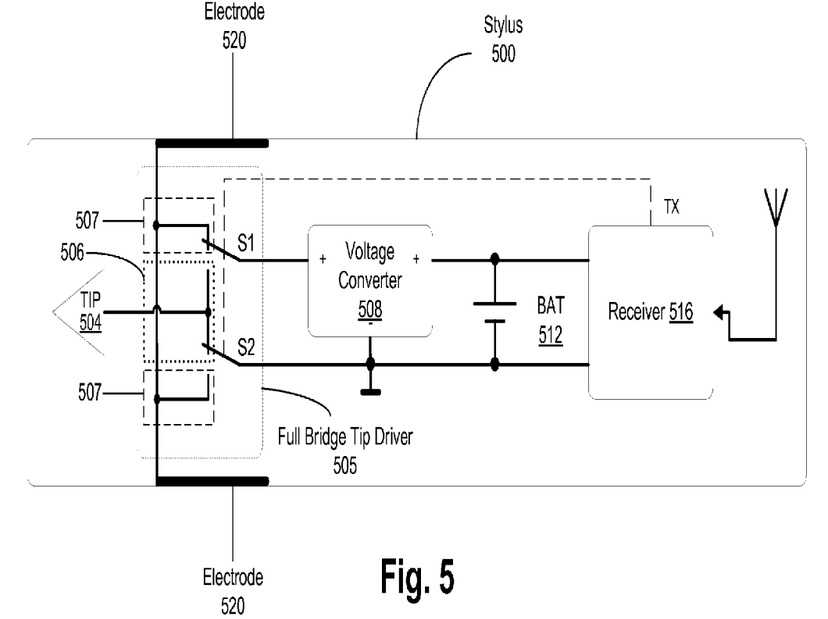
FIG. 5 is a block diagram of a stylus, according to another embodiment.

FIG. 5 is a block diagram of a stylus 500, according to another embodiment. The stylus 500 includes a full bridge tip driver 505, a tip 504, electrodes 520, a voltage converter 508, a battery 512, and a receiver 516. As discussed above, in one embodiment, the stylus 500 may be a synchronized stylus, which uses the receiver 516 so receive a synchronization signal. In another embodiment, the stylus 500 may be an unsynchronized stylus, and the receiver 516 may not be included in the stylus 500.

Similar to FIG. 3, the battery 512 may provide power to the receiver 516 and to the voltage converter 508, and the tip 504 may transmit a TX signal to an ITO panel. The receiver 516 may receive a synchronization signal from the ITO panel.

The full bridge tip driver 505 includes two bridge branches 506 and 507. The first bridge branch 506 (shown as a dotted box) is coupled to the tip 504. The second bridge branch 507 (shown as two lined boxes) is coupled to the electrodes 520. The electrodes 520 may be used to connect with the body of the user (e.g., a human body). The electrodes 520 may form the current return path for the stylus 500. Adding the capacitance of the human body to the current return path decreases the resistance of the circuit formed between the ITO panel and the stylus 500. Decreasing the resistance of the circuit allows more electrical current to flow through the circuit, which increases the TX signal transmitted by the tip 504.

Figure 6:
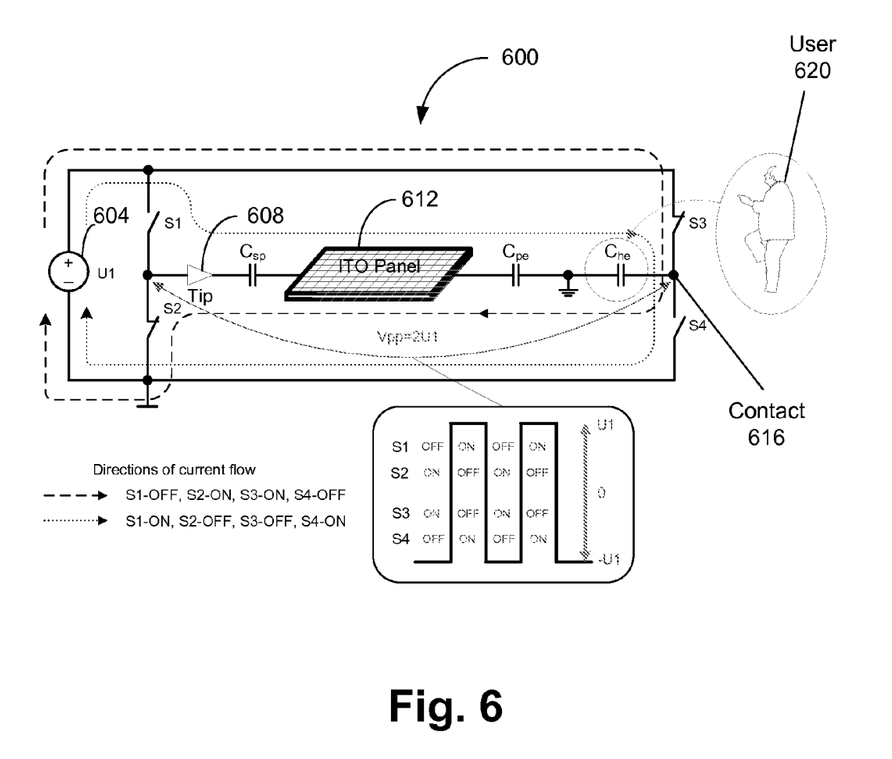
FIG. 6 is a block diagram illustrating an electrical equivalent circuit diagram of a stylus on an ITO panel, according to one embodiment.

FIG. 6 is a block diagram 600 illustrating an electrical equivalent circuit diagram of a stylus on an ITO panel, according to one embodiment. The block diagram 600 includes a power source 604, four switches S1, S2, S3, and S4, a tip 608, a contact 616, an ITO panel 612, and a user 620.

The power source 604, the tip 608, contact 616, and four switches S1, S2, S3, and S4 are part of the stylus. The contact 616 is coupled to one or more electrical contacts (e.g., electrodes) which are in turn, coupled to the body of the user 620. The electrical contacts may also be part of the stylus. As discussed above, $C_{sp}$ is the capacitance between the tip 608 of the stylus and the ITO panel 612. $C_{pe}$ is the self-capacitance of the ITO panel 612 relative to ground. $C_{he}$ is the self-capacitance of the body of the user 620 (e.g., a human body), relative to ground. The electrical current received from the body of the user 620 is used to increase the TX signal (e.g., increase the amplitude) transmitted by tip 608 of the stylus to the ITO panel 612.

In one embodiment, the switches S1 and S2 may be mutually exclusive switches. For example, if switch S1 is connected (e.g., on), then switch S2 is not connected (e.g., off), and vice versa. In another embodiment, the switches S3 and S4 may also be mutually exclusive switches, similar to switches S1 and S2. In one embodiment, the switches S1 and S2 are coupled to the tip 608 and may form part of the first bridge branch, as discussed above in FIG. 5. In another embodiment, the switches S3 and S4 are coupled to an electrical contact (e.g., an electrode) on the stylus ad may form the second bridge branch, as discussed above in FIG. 5. In one embodiment, when switches S1 and S4 are off and switches S2 and S3 are on, the tip 608 transmits a TX signal (e.g., an electrical current) with an amplitude of −U1 and when switches S1 and S4 are on and switches S2 and S3 are off, the tip 608 transmits a TX signal (e.g., an electrical current) with an amplitude of U1.

As shown in FIG. 6, the flow of the electrical current when switches S1 and S4 are off and switches S2 and S3 are on, is shown by the dashed line. The flow of the electrical current when switches S1 and S4 are on and switches S2 and S3 are off, is shown by the dotted line.

Providing an electrode in the stylus and coupling the an electrical current from the human body to the stylus through the contact 616 and the switches S3 and S4 allows the stylus to transmit a TX signal (e.g., an electrical current) with an ranging from −U1 to U1. This range of −U1 to U1 is double the range of 0 to U1, shown in FIG. 4. In other words, the amplitude of the TX signal (e.g., electrical current) transmitted by the tip 608 is double compared to the amplitude of the TX signal transmitted by the tip 406 shown in FIG. 4. The amplitude of the TX signal is doubled by using the full bridge tip driver shown in FIG. 5. By coupling the user's body (e.g., the capacitance of the user's body) to the circuit via the electrodes and contact 616, the capacitance of the user's body $C_{he}$ replaces the capacitance $C_s$ (shown in FIG. 4). Replacing the smaller capacitance $C_s$ with the larger capacitance $C_{he}$ decrease the resistance of the circuit, which results in an increase in the flow of current through the electrical circuit. The increase in the amplitude of the TX signal and the increase in the current which flows through the circuit are achieved without increasing the power consumption of the stylus (e.g., without increasing the amount of power drawn from the battery).

In one embodiment, the increase in the TX signal generated by the stylus increases the signal-to-noise ratio (SNR) of the TX signal. Increasing the TX signal (e.g., increasing the SNR) allows the ITO panel 612 to better detect the stylus position when the stylus is contacting the ITO panel 612 or hovering over the ITO panel. In one exemplary embodiment, a stylus without an electrode (e.g., an electrical contact) may have a TX signal with an SNR of 15 when the stylus is in contact with the ITO panel 612 and an SNR of 5.8 when the stylus is hovering over the ITO panel 612 (e.g., stylus is ~15 mm away from the ITO panel). In another exemplary embodiment, providing an electrode to receive introduce the capacitance of the human body of the user 620 into the circuit between the stylus and the ITO panel 612 may increase the SNR of the TX signal to 40 when the stylus is in contact with the ITO panel 612 and to 16, when the stylus is hovering over the ITO panel 612. In one embodiment, this increase in TX signal (achieved by providing an electrode to introduce the capacitance of the body of the user 620 into the circuit) may allow the stylus to consume less power from the power source 604 of the stylus. For example, if the ITO panel 612 can accurately detect a stylus contact when the SNR of the TX signal of the stylus is 15, then the power used from the power source 604 may be decreased, because the SNR of the TX signal is 40 due to the increased capacitance and decreased resistance of the circuit resulting from introducing the capacitance of the body of the user 620 into the circuit. The increased capacitance and decreased resistance of the circuit allows more current to flow through the circuit which increases the TX signal transmitted by the stylus. The increased current flow resulting from adding the capacitance of the user's body to the circuit may be used to offset the amount of power used from the power source 604.

Figure 7:
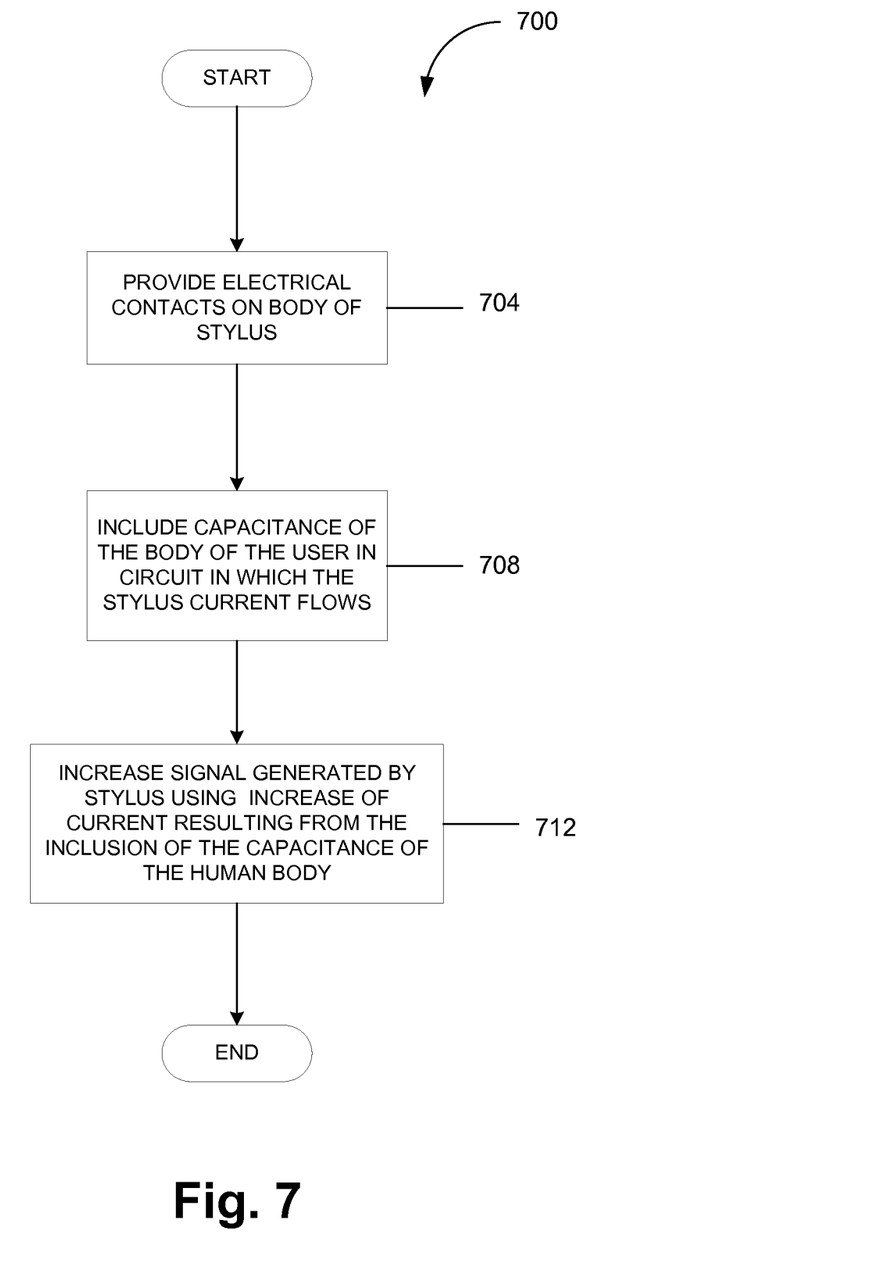
FIG. 7 is a flow diagram illustrating a method of increasing the TX signal generated by a stylus.

FIG. 7 is a flow diagram illustrating a method 700 of increasing the TX signal generated by a stylus. In one embodiment, the TX signal may be increased by increasing the amplitude of the TX signal. The method 700 may be performed by a stylus that comprises hardware (e.g., circuitry, electrodes, switches, dedicated logic, programmable logic, microcode), software (e.g., instructions run on a processing device to perform hardware simulation), or a combination thereof. The stylus may be configured to increase the TX signal generated by the stylus, without increasing the power consumption of the stylus. In one embodiment, method 700 may be performed by stylus 500 as shown in FIG. 5.

The method 700 begins with providing one or more electrical contacts (e.g., electrodes) on the body of the stylus (block 704). In one embodiment, the one or more electrical contacts may directly contact the body of a user. In another embodiment, a material (e.g., plastic, etc.) may be positioned between the one or more electrical contacts such that the electrical contacts do not come into direct contact with the body of the user. At block 708, the capacitance of the body of the user is introduced to the circuit in which the stylus current (e.g., electrical current) flows, via the electrical contacts. The increased capacitance resulting from the introduction of the capacitance of the human body increases the amount of current which flows through the stylus to the ITO panel, due to the decrease in the resistance of the circuit (block 712). The increase in the amount of current which flows through the stylus increases the signal (e.g., the TX signal) generated by the stylus and also results in an increase (e.g., doubling) in the amplitude of the TX signal.

Figure 8:
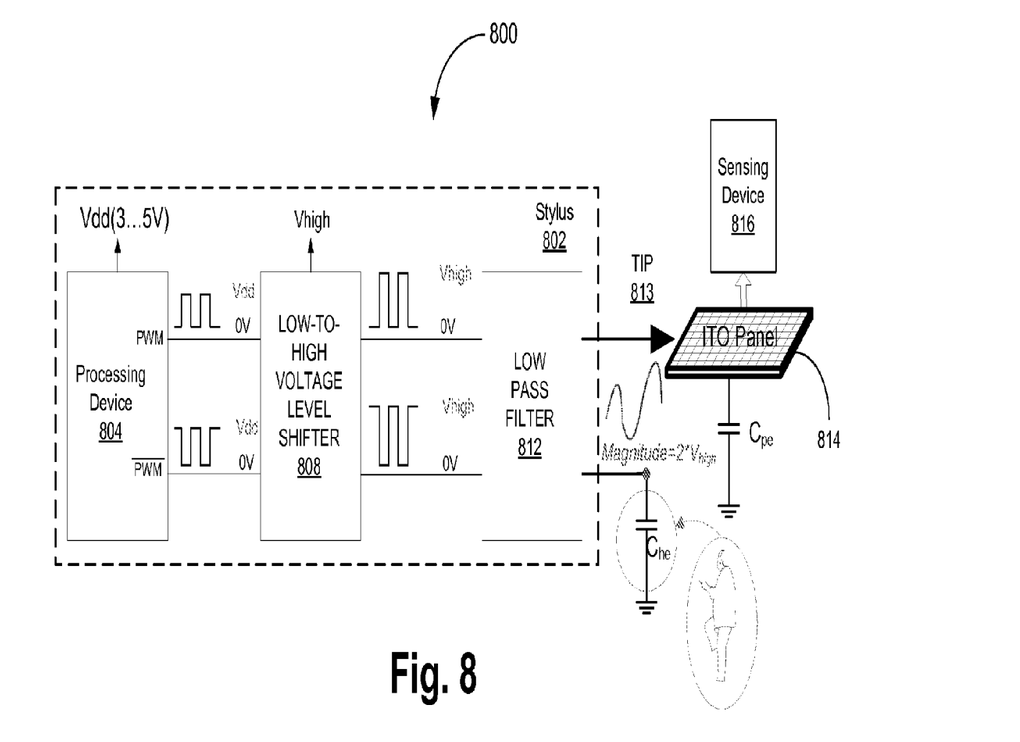
FIG. 8 is a block diagram of a stylus and an ITO panel, according to another embodiment.

FIG. 8 is a block diagram 800 of a stylus 802 and an ITO panel 814, according to another embodiment. The block diagram includes the stylus 802, an ITO panel 814, and a sensing device (e.g., a processing device) 816. In one embodiment, the stylus 802 may convert a TX signal from a square signal (e.g., a square shape) to a sinusoidal signal (e.g., a sine wave shape).

The stylus 802 includes a processing device 804 which regulates the voltage supplied to low-to-high voltage level shifter 808. The low-to-high voltage level shifter 808 increases (e.g., boosts) the voltage received from the processing device 804. The increased voltage is passed from the low-to-high voltage level shifter 808 to the low pass filter (LPF) 812. The LPF 812 converts the square signal into a sinusoidal signal, which is transmitted by the tip 813 of the stylus 802 to the ITO panel 814. As discussed above, $C_{pe}$ is the self-capacitance of the ITO panel 814 relative to ground and $C_{he}$ is the self-capacitance of a body of the user (e.g., a human body), relative to ground. In one embodiment, the LPF 812 may be connected to the body of the user, which replaces the capacitance $C_s$ (shown in FIG. 4) with the larger capacitance $C_{he}$, which allows more current to flow through the circuit, as discussed above.

In one embodiment, the stylus 802 may convert the TX signal from the square signal to the sinusoidal signal depending on whether the ITO panel 814 can better detect a square signal or a sinusoidal signal. Depending on the type of the ITO panel 814, the ITO panel may detect square signals better than it can detect sinusoidal signals, or vice versa. For example, the stylus 802 may convert a TX signal from a square signal to a sinusoidal signal if the ITO panel 814 can better detect sinusoidal signals.

Figure 9:
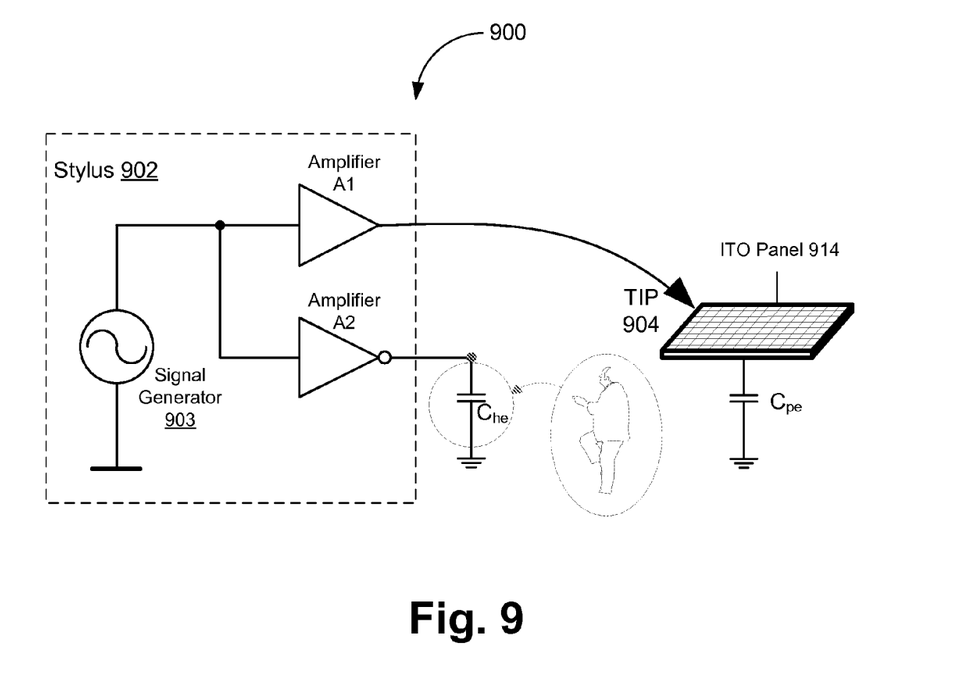
FIG. 9 is a block diagram of a stylus and an ITO panel, according to another embodiment.

FIG. 9 is a block diagram 900 of a stylus 902 and an ITO panel 914, according to another embodiment. The stylus 902 includes a signal generator 903, a tip 904, an amplifier A1, and an inverted amplifier A2. In one embodiment, the signal generator 903 may be a sinusoidal signal generator (e.g., a generator which generates sinusoidal shaped signals). The amplifier A1 is coupled to the tip 904. The signal generated by the signal generator 903 is amplified by the amplifier A1 and transmitted to the ITO panel 914 via the tip 904. The inverted amplifier A2 is coupled to the body of a user via one or more electrical contacts (e.g., electrodes) on the body of the stylus 902. The inverted amplifier A2 inverts (e.g., reverses) the signal received from the signal generator 903 and transmits the inverted signal to the user via the one or more electrical contacts. In one embodiment, the inverted amplifier A2 may be connected to the body of the user which replaces the capacitance $C_s$ (shown in FIG. 4) with the larger capacitance $C_{he}$, which allows more current to flow through the circuit, as discussed above.

Embodiments of the present invention include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); or another type of medium suitable for storing electronic instructions. In one embodiment, the machine-readable medium may comprise a non-transitory machine-readable medium.

Additionally, some embodiments may be practiced in distributed computing environments where the machine-readable medium is stored on and executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. An active stylus configured to capacitively couple with a sensor array to indicate a position on the sensor array, comprising:
   an elongated stylus body having a distal end;
   a first electrode positioned at the distal end of the stylus body to form a stylus tip;
   a second electrode positioned on the stylus body to couple via a human body to an earth ground;
   a power source;
   a signal converter driven by the power source, the signal converter including one of a booster and a low-to-high voltage level shifter that boosts a voltage from the power source to supply boosted signals having an increased voltage to the first and second electrodes; and
   a controller configured to selectively supply the boosted signals outputted from the signal converter to the first and second electrodes.

2. The active stylus of claim 1, further comprising a signal reception circuitry, wherein the controller is configured to selectively supply the boosted signals outputted from the signal converter to the first and second electrodes in accordance with timings of signals from the sensor array received by the signal reception circuitry.

3. The active stylus of claim 2, wherein the signals from the sensor array are timing signals, which the controller uses to control selective supply of the boosted signals outputted from the signal converter to the first and second electrodes.

4. The active stylus of claim 1, further comprising a signal reception circuitry, wherein the controller is configured to synchronize the boosted signals outputted from the signal converter with signals received by the signal reception circuitry.

5. The active stylus of claim 1, further comprising a signal reception circuitry configured to wirelessly receive signals from the sensor array, wherein the controller is configured to selectively supply the boosted signals outputted from the signal converter to the first and second electrodes such that the boosted signals have a defined timing relationship with the signals wirelessly received from the sensor array.

6. The active stylus of claim 1, further comprising a signal reception circuitry configured to inductively receive signal from the sensor array, wherein the controller is configured to selectively supply the boosted signals outputted from the signal converter to the first and second electrodes such that the boosted signals have a defined timing relationship with the signals inductively received from the sensor array.

7. The active stylus of claim 1, wherein the power source is a battery.

8. An active stylus configured to capacitively couple with a sensor array to indicate a position on the sensor array, comprising:
   a first electrode that forms a stylus tip;
   a second electrode provided to couple via a human body to an earth ground;
   a power source;
   a signal converter driven by the power source, the signal converter including one of a booster and a low-to-high voltage level shifter that boosts a voltage from the power source to supply boosted signals having an increased voltage to the first and second electrodes;
   a reception circuitry configured to receive signals from the sensor array; and
   a controller configured to synchronize the boosted signals outputted from the signal converter with the signals from the sensor array received by the reception circuitry and to selectively supply the boosted signals outputted from the signal converter to the first and second electrodes.

9. An active stylus configured to capacitively couple with a sensor array to indicate a position on the sensor array, comprising:
   a first electrode that forms a stylus tip;
   a second electrode provided to couple via a human body to an earth ground;
   a power source;
   a signal converter driven by the power source, the signal converter including one of a booster and a low-to-high voltage level shifter that boosts a voltage from the power source to supply boosted signals having an increased voltage to the first and second electrodes;
   a reception circuitry configured to receive signals from the sensor array; and
   a controller configured to selectively supply the boosted signals outputted from the signal converter to the first electrode and to the second electrode in accordance with timings of the signals from the sensor array received by the reception circuitry.

10. The active stylus of claim 9, wherein the signals received from the sensor array are timing signals, which the controller uses to control selective supply of the boosted signals outputted from the signal converter.

11. A method executed in an active stylus configured to capacitively couple with a sensor array to indicate a position on the sensor array, the method comprising:
   boosting a voltage from a power source of the active stylus to generate boosted signals having an increased voltage; and
   synchronizing boosted signals selectively supplied to a first electrode forming a stylus tip of the active stylus and to a second electrode of the active stylus provided to couple via a human body to an earth ground with signals received from the sensor array.

12. A method executed in an active stylus configured to capacitively couple with a sensor array to indicate a position on the sensor array, the method comprising:
   boosting a voltage from a power source of the active stylus to generate boosted signals having an increased voltage; and
   selectively supplying boosted signals to a first electrode forming a stylus tip of the active stylus and to a second electrode of the active stylus provided to couple via a human body to an earth ground in accordance with timings of signals received from the sensor array.

\* \* \* \* \*